May 23, 1972   H. S. MONTGOMERY ET AL   3,664,562
PROJECTION APPARATUS FOR SEQUENTIAL TIMED
PRESENTATION OF INDIVIDUAL FRAMES
Filed June 30, 1969   2 Sheets-Sheet 1
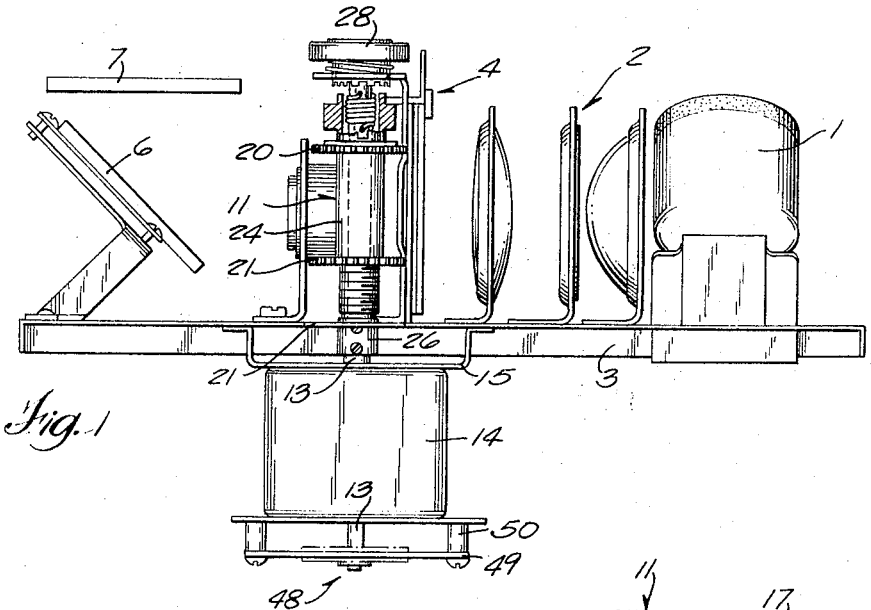
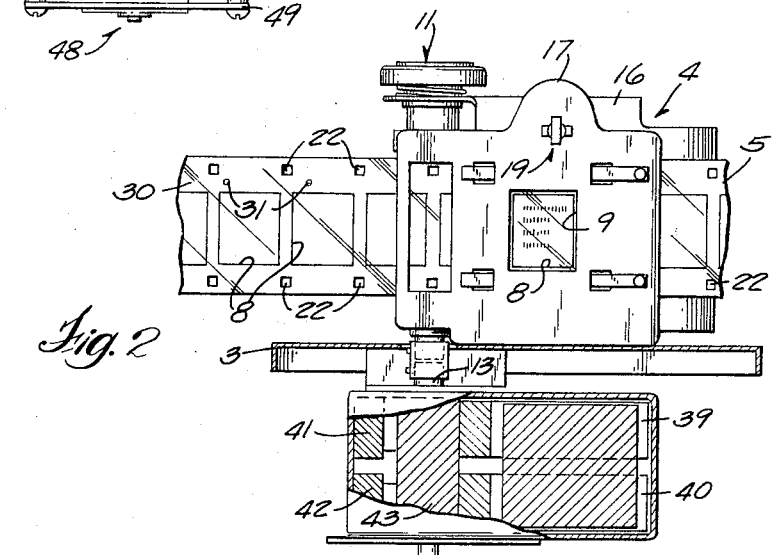
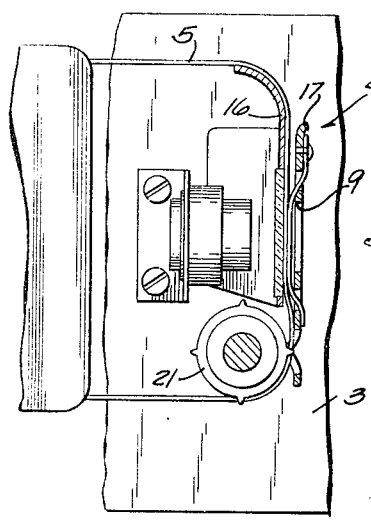
Inventors
David A. Nutting
Harold S. Montgomery
By
Andrus, Sceales, Starke & Sawall
Attorneys

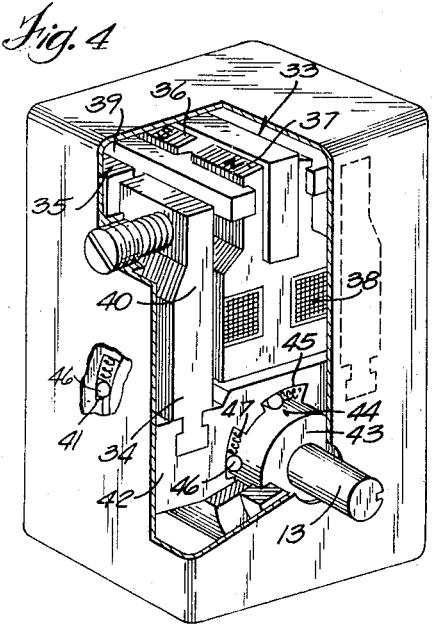

3,664,562
PROJECTION APPARATUS FOR SEQUENTIAL
TIMED PRESENTATION OF INDIVIDUAL
FRAMES
Harold S. Montgomery and David J. Nutting, Milwaukee,
Wis., assignors to Nutting Industries, Ltd., Milwaukee,
Wis.
Filed June 30, 1969, Ser. No. 837,724
Int. Cl. G03b 1/24
U.S. Cl. 226—76                                 6 Claims

ABSTRACT OF THE DISCLOSURE

The disclosure includes a multiple frame film strip selectively aligned in a projector. The frames are divided into a plurality of different categories, with the corresponding sequenced information of the several categories presented as a group of adjacent frames on the film strip. A vibrating pole motor includes a one-way clutch driving a rotating shaft.

Film drive sprockets are connected directly to the shaft and movement of the shaft and sprockets stop within one-half cycle after removal of the applied alternating power.

Each complete revolution of the shaft positions the film strip from a given question in a category to the next succeeding question in the same category. A switch unit is connected directly to the rotating shaft to control the sequential motor energization.

BACKGROUND OF INVENTION

This invention relates to a stepped strip projection apparatus and particularly to such an apparatus for sequentially presenting individual frames for viewing where the frames are not necessarily presented in immediate succeeding order.

In the development of information presentations and response apparatus employed for teaching, amusement and the like, systems have been developed employing a film strip for visual presentation of the desired information to the operator. For example, the pending U.S. application entitled Instructional Device, which was filed on Nov. 19, 1968, Ser. No. 776,988 by Harold S. Montgomery and which is assigned to the same assignee as the present application discloses an instructional device of the multiple choice question and answer type wherein the given information or questions is presented in a stepped manner by corresponding positioning of a film or the like. As more fully disclosed therein, the film strip may be provided with a plurality of different inter-related categories which the operator of the apparatus or device can arbitrarily select. In such a system the several categories will include a series of questions and multiple choice answers.

These several categories may advantageously be recorded on a film strip with the first question of each category placed on succeeding film frames as a first frame or question group followed by 2nd, 3rd and following similar groups of related category questions of the several categories such that the film strip can employ. A control means on the film strip proper may control a selection circuit to sequentially present the several questions of the selected category by stepped movement from one group to the next group to present in sequence the questions of a selected category. Although not necessary, the system may operate whereby a proper answer results in the skipping of one or more succeeding questions. In such systems, therefore, the film strip may rapidly move past one or more frame groups and not necessarily move the same distance each time.

Practical difficulties have been found in establishing accurate stopping of the film mechanism for precise location of a frame in the projecting means. Conventionally, the projectors include a motor driven system coupled to the film through suitable sprockets and film perforations in the opposite edges of the film. However, it is difficult to accurately stop the motors instantaneously. Furthermore, the inertia in the drive system generally results in a slight coasting of the film mechanism. The precise degree of coasting cannot be accurately controlled as a practical matter and consequently, the positioning of the film frame may not be precisely repeated with each movement. Furthermore, the electrical circuitry for controlling the film movement in accordance with the selected category has required relatively complex inter-locking circuitry to provide the desired movement and positioning of the film in accordance with the desired selected category.

SUMMARY OF THE INVENTION

The present invention is particularly directed to an improved drive system for a multiple frame strip carrying a plurality of individual frames which are to be selectively aligned in a presentation device, and in particular, to a film strip drive for timed presentation of a film having a plurality of different categories, each of which includes a plurality of frames with the corresponding information of the several categories presented as a group of adjacent frames on the film strip. Generally, in accordance with the present invention, a vibrating drive motor is coupled by a one-way clutch or coupling mechanism to a rotating shaft carrying the film sprockets and thus establishing a direct drive connection to the film sprockets. The vibrating motor is such that it can stop within one-half cycle of the applied alternating power with a resulting practically instantaneous positioning of the drive sprockets and the coupled film. Applicant has found that this results in a very precise and repeatable location of the individual frames of a film strip in a projector.

Furthermore, the system in accordance with a particularly novel aspect of the present invention is constructed such that each complete revolution of the shaft positions the film strip from a given question in a category to the next succeeding question in the category carried by the film strip. Thus, where the device is employed with four categories, each quadrant or 90 degree rotation transports or steps the film strip precisely one frame. Each complete revolution therefore transports the film strip the four frames and thereby moves to present the succeeding questions of the respective selected category. This has been found to provide an exceptionally satisfactory drive system when employing a 16 millimeter film wherein the drive notches on the film are spaced precisely in accordance with one frame on the film strip. Thus, when inserting the film strip it is merely necessary to dispose the film onto the sprocket to precisely align a frame within the projector. In accordance with a preferred construction, the drive preferably includes an adjustable means for moving of the sprockets relative to the film strip to permit other millimeter films to be employed. For example, the conventional 35 millimeter where a substantial number of drive notches appear within each frame. In such a film strip it is necessary to precisely align the frame and then to adjust the drive sprockets with the spokes into alignment with the notches.

A further advantage resulting from the single revolution per sequencing of information presentation in a multiple category film strip as described above is obtained by connecting of a selection switch control directly to the motor shaft. Thus, in the selection system a rotary selection switch may be connected into the circuit of the category selection means. The rotary switch is divided into a control portion for each of the categories and coupled directly to the motor shaft. Each complete revolution results in a corresponding rotation of the selection switch, such that positioning of the stepping switch is related to the category positioning of the film. When a selection is made it interconnects the desired control portion of the rotary switch into the motor control circuit to rotate the motor until the desired film strip frame is aligned within the projector. Subsequently, each actuation will require a corresponding complete revolution of the motor shaft to present the subsequent question or frame related to that category.

In a preferred construction, the rotary switch includes a first switch side having a plurality of equicircumferentially spaced stationary contacts, one for each category, and a rotary contact. The rotary switch sequentially interconnects and actuates the several category contacts in a continuing sequence. This contact in turn is interconnected into the circuit with a relatively negative logic such that the desired category contact is dead as a result of selection thereof. The other three contacts thereby are maintained with power and send out a signal rejecting such category. The motor will continue to operate until such time as the rotating contact moves into engagement with the dead contact. The motor continues to rotate even though there is engagement with the dead contact until a second stop switch is actuated. The second switch includes a rotating contact secured to the shaft and engaging a conductive ring having four stop points such as a gap in the conductive ring. Once a category switch has been engaged, the motor continues to rotate until the second rotating contact is aligned with the next control gap which results in the opening of the circuit to the motor and the essentially instantaneous stopping of the motor and film strip precisely align a proper frame within the projector.

The present invention thus provides a highly improved film strip drive particularly adapted for teaching machine or devices and the like, wherein it is desired to sequentially present spaced film frames through a projection device and in particular, where a plurality of different categories have the questions of each category interposed with the questions of the other categories.

The drawings furnished herewith illustrate the best mode presently contemplated by the inventor for carrying out the subject invention and in which the above advantages and features are clearly disclosed as well as others which will be readily understood from the following description of the illustrated embodiment.

BRIEF DESCRIPTION OF DRAWINGS

In the drawings:

FIG. 1 is a side elevational view of a projector constructed in accordance with the present invention;

FIG. 2 is a view taken generally on broken line 2—2 of FIG. 1 and illustrating the film drive mechanism and the relationship of the drive mechanism with respect to the multiple frame film strip;

FIG. 3 is a fragmentary horizontal section taken through the film frame alignment unit shown in FIGS. 1 and 2;

FIG. 4 is a diagrammatic illustration of the drive motor shown in FIG. 1;

FIG. 5 is a back view of the motor illustrating a special control switch construction mounted directly on the film strip shaft;

FIG. 6 is a view from the other side of rotary switch shown in FIG. 5 and taken generally along lines 6—6 of FIG. 1;

FIG. 7 is a fragmentary section taken generally on line 7—7 of FIG. 5; and

FIG. 8 is a schematic circuit simplified diagram illustrating the switch circuit interconnection for purposes of controlling the film drive motor.

DESCRIPTION OF THE PREFERRED ILLUSTRATED EMBODIMENT

Referring to the drawings and particularly to FIG. 1, the present invention is shown applied to a standard film projector, including a light source lamp 1 interconnected in alignment with a lens system 2 to one side of a mounting plate 3. A film frame holder 4 is secured to the plate in alignment with the lens system 2 and is adapted to support a film strip 5 in alignment with the lens system for projection of an image therefrom onto a mirror 6. The mirror in turn reflects the light image 90 degrees onto a suitable viewing screen 7. The film strip 5 may be of any desired medium, such as a clear cellulose having the information placed thereon in spaced blocked out identical frames 8, each of which is adapted to be precisely aligned with a corresponding opening 9 in the film holder 4. Within each frame the information to be transmitted to the screen 7 is presented, as printed matter for example. Thus, a question may be presented followed by a series of possible answers, only one of which is correct. The film projector is, therefore, such as may be employed in a question and answer device, shown in the previously referred to co-pending application of Harold Montgomery.

The film strip 5 is an endless member housed in a suitable magazine 10 and adapted to be driven through the holder 4 with the various frames 8 precisely aligned with the opening 9. The strip 5 is driven by a sprocket drive unit 11, which extends through an opening 12 in the mounting plate 3 and is connected directly to a drive shaft 13 of a special drive motor 14. In the illustrated embodiment of the invention, the motor 14 is secured to the backside of the mounting plate 3 as by a bracket 15 to support the motor 14 and the sprocket drive unit 11 in proper positioning for driving of the film strip 5.

The present invention is particularly directed to the drive motor unit. Thus, these are described in detail with the other components being described in such detail as to provide a clear and definite understanding of the present invention.

The film holder 4 includes a fixed mounting and guide plate 16 secured to the mounting plate 3 and having a glass covered opening, past which the film strip 5 is transferred. The plate 16 includes an upper and lower guide 18 for vertically locating of the film strip 5 within the holder 4. A clamping plate 17 is secured to the mounting plate 3 and has the opening 9 corresponding to the viewing portion of each frame 8 of the film strip 5. A releasable latch 19 is adapted to support the plate 17 in clamping engagement with the fixed guide plate 16 to hold the film strip 5 adjacent the glass surface and between the guide strips 18. The film strip 5 presents a flat surface through which the light is projected for purposes of transmitting a clear image of the information on the aligned frame 8.

The sprocket drive unit 12 is located immediately adjacent to discharge side of the holder 4 and includes a pair of interconnected sprockets 20 and 21, which are vertically spaced in accordance with the drive openings 22 on the opposite edges of the film strip 5.

The sprockets 20 and 21 similarly include sprocket teeth 23, which are spaced in accordance with the longitudinal spacing of the drive openings 22 on the film strip 5 to provide the usual type of drive connection to the film strip. In the illustrated embodiment of the invention, the film strip 5, as most clearly shown in FIG. 2, is a typical 16 millimeter film wherein the drive openings 22 are longitudinally spaced in accordance with the size of the individual frames 8. The sprocket assembly is spaced from opening 9 such that with the sprockets engaging the openings, a frame 8 is aligned with the viewing or transmitting opening 9 in the holder 4, as subsequently described. This provides a very convenient means of inserting and aligning the film strip in the apparatus.

The apparatus may, of course, be constructed for other forms of films, such as the standard 35 millimeter film having a plurality of spaced openings within each frame. Proper initial positioning of the film strip 5 then requires slight adjustment of the film strip and the sprocket relative to the viewing opening 9. The sprocket drive unit 12 is therefore preferably formed with a dual shaft construction such as shown in vertical section in FIG. 1. The drive sprocket unit 12 includes a drive hub 24 having the sprockets 20 and 21 secured to the opposite ends thereof and mounted on a drive shaft 25, which in turn is coupled directly to the motor shaft 13 as by a coupler 26. The hub 24 is releasably coupled by a coiled spring 27 to the drive shaft 25 for simultaneous direct movement with the shaft 25 as a result of rotation of the motor shaft 13 for a corresponding strip feed rotation of the sprockets. A releasing knob 28 is slidably mounted to the upper end of the drive shaft 25 and includes a lower notched edge adapted to mate with an offset lever end of the coupling spring 27. The depression and rotation of the release knob 28 in the stepping direction of the motor results in the simultaneous positioning of the hub 24 and attached sprockets 20 and 21 with the drive shaft 25. However, the depression and opposite rotation of the knob 28 results in the free movement of the hub 24 and attached sprockets 20 and 21 on the drive shaft 25 to permit positioning of the sprockets and the film strip 5 relative to opening 9 and the drive shaft 25. This permits adjustment such that proper sequential positioning of the film strip 5 through the film holder 4 is obtained by the predetermined rotation of motor 14. The drive motor 14 is energized as hereinafter described in a cyclical and timed manner to sequentially present the several frames 8 upon the screen 7. As most clearly shown diagrammatically in FIG. 2, the illustrated film strip 5 includes successive groups of frames 8, each of which includes a question from one of the possible categories which the apparatus is associated. The category selection and the question selection may be controlled by proper placement of a readout signal control directly upon the film strip. For example, in the illustrated embodiment, the film strip 5 is provided with an opaque longitudinal border 30, between the frames 8 and spaced drive openings 22 are provided with the location of the opening related directly to the category. The frames 8 in each of the frame groups is uniquely coded with a clear, light transmitting block 31 within the opaque border 30. The code blocks 31 for the several different categories are laterally offset and aligned with corresponding code blocks in all other frame groups. As a result the coding appearing on the film strip 5 similarly repeats itself for each category.

The signal may be read photo-electrically or the like to provide a control signal inter-related to the selected category. Each of the signals would be read and fed into a control circuit with a selection by the operator determining which of particular series of aligned signal blocks 31 within the groups would be operative.

The drive motor 14 in accordance with the present invention is a vibrating type drive motor rather than the more conventional continuously rotating type motor. The motor 14 is preferably constructed as an oscillating motor such as that sold by Energy Conversion Systems Corporation of Grafton, Wis., under the trademark Enercon, model 45 motor. Such a motor is diagrammatically shown in FIG. 4. The motor 14 generally includes an outer housing within which laminated field assembly 33 is mounted. The field assembly 33 includes a pair of U-shaped laminated poles 34 and 35, each of which includes a permanent magnet 36 and 37, respectively. An alternating current coil 38, which may be connected to the usual 60 cycle alternating current power supply encircles the two poles to establish a corresponding alternating flux which alternately aids and opposes the flux of the magnets 36 and 37. The two permanent magnets 36 and 37 are oppositely polarized such that the alternating flux supplied by coil 38 adds to the flux of the one permanent magnet 36 and subtracts from that of the opposite magnet 37 during one-half cycle and then reverses during the opposite half cycle; adding to the second magnet 37 and subtracting from the first magnet 36. A pair of laminated oscillators 39 and 40 are mounted in side-by-side relationship, with arms disposed to the opposite side of the poles 34 and 35 and with the lower ends of the arms interconnected to a related pivotally mounted stator 41 and 42. The stators 41 and 42 in turn encircle a common rotor 43 carrying the motor drive shaft 13. As a result the oscillators 39 and 40 are caused to oscillate, with the movement 180 degrees out of phase. Thus, during one-half cycle, the one oscillator 39 rotates in a clockwise direction and simultaneously the opposite oscillator 40 rotates in a counter clockwise direction. During the next half cycle, the oscillator 40 rotates in a clockwise direction while the first oscillator rotates in a counter clockwise direction. With a 60 cycle current, each half cycle results in a forward power stroke producing a total of 120 power strokes or movements per second of the rotor 43 and the drive shaft.

The oscillator stators 41 and 42 are coupled to the rotor 43 through a one-way drive or clutch unit 44. In the illustrated embodiment of the invention, the circumference of the stators 41 and 42 are formed with similar equicircumferentially spaced cavities 45 within which rollers 46 are disposed. The base of the cavities 45 are inclined planes relative to the rotor 43. Springs 47 urge the rollers 46 to the deep end of each related cavity 45 and in the absence of rotation are held therein. As an oscillator stator 41 or 42 moves in a clockwise direction, as viewed in FIG. 4, the rollers 46 are carried forwardly and wedge between the surface of the rotor 43 and the corresponding stator. This results in a clockwise rotation of the rotor 43 and shaft 13. During the return of the assembly, the roller 46 unlocks and moves into the relatively deep portion thereby preventing creation of a counter clockwise drive force on the rotor 43.

In summary, the two oscillators, including the individual stators 41 and 42 coupled to the single rotor 43, provide the continuous stepping with one step being provided by each half cycle of the power supply. Furthermore, as a result of this type of operation the motor 13 terminates the driving force within one-half cycle of the power supply. Applicant has found that this drive system provides very accurate control of the movement of the film strip 5.

In addition, applicant has found that the drive can be selected to produce the desired sequential category movement of the film strip 5 in a single revolution of the shaft 13. This in turn provides a very advantageous use of a novel switch structure connected to be driven directly in synchronism with drive shaft 13. In the illustrated embodiment of the invention, a rotary control switch unit 48 is secured to the opposite end of the motor drive shaft 13 as follows.

As most clearly shown in FIG. 5, the switch unit 48 includes a switch contact mounting plate 49 formed of a suitable insulating material. The plate 49 is secured to the underside of the motor 13 and is spaced slightly from the motor 13 by suitable mounting bolt units 50. The center of the plate 49 is provided with a relatively large opening within which a rotor plate 51 is disposed. Plate 51 is formed of an insulating material and is secured in any suitable manner to the motor shaft 13.

The plate 49 is furthermore provided with a plurality of openings or slots 51a on the inner circumference with a mounting hole immediately behind each opening. A contact is riveted or otherwise secured within selected holes and connected to a related category selection lead. In the illustrated embodiment of the invention, it has been assumed that there are four categories to be controlled. The switch structure is divided into four quadrants, one for each category and is provided with four equicircumferentially spaced contacts 52, 53, 54 and 55, one in each quadrant. Each contact 52–55 is riveted or otherwise secured within selected holes and connected to a related category selection lead 56. Each contact 52–55 generally includes a U-shaped contact clip aligned with and disposed in the corresponding opening, with the clip opening radially inwardly of the surface of the plate 51. The rotor plate 51 carries a ring-like contact 57, which is spaced inwardly of the contact clips, except for a control contact portion 58 which projects outwardly for one quadrant or ninety degrees into the circumferential path of the clips. The rotation of the rotor 43 thereby sequentially move the contact portion 58 between the arms of the successive contact clips and provides an electrical circuit connection between the contacts 52–55 and the contact 57. The contact portion 58 is in engagement with one of the category contacts 52–55 at any given instant and provides a circuit connection from that engaged contact into an output selection contact 59 which is secured into any position on the plate 49, with the contact clip thereof extending inwardly and into engagement with the continuous ring contact 57. The output selection contact 59 is connected to a motor control lead 60 providing power to the motor control circuit.

The logic of the circuitry is preferably a negative type logic, wherein power is applied in a stand-by condition to all four of the control category contacts 52–55 and thereby a continuous signal is maintained on the control selection and motor lead 60. When an operator makes a selection by actuating of a push button switch 61 or the like, the motor 14 is momentarily energized and attached in circuit via the category contacts 52–55. The circuit to the related category lead 56 and contact of the selected category is opened. When the motor 14 rotates and the contact cam or contact portion 58 engages the related dead contact 52–55, the power circuit to the control lead 61 is opened. This in turn conditions the circuit for purposes of stopping the vibrating motor 14.

The actual termination of the motor energization is interlocked with a precise location control switch means interconnected to and forming a part of the control switch unit 48, as follows: A rotating contact disc 62 is secured to the opposite side of the rotor plate 51 of the switch unit 48, and thus is driven in synchronism with the first name rotating switch structure. The disc 62 is provided with four equicircumferentially spaced notches 63, each of which is related to a single one of the control contacts 52–55. A final control contact 64 is secured to the plate 49 with a clip portion disposed to the opposite side of plate 49 and extended over the periphery of disc 62. Contact 64 is connected to similarly establish a power circuit connection to the motor 14. Therefore, after the first switch unit 48 conditions the circuit to stop the motor 14, the motor 14 will continue to rotate until the next notch 63 in the disc 62 is aligned with the final control contact 64, at which time the circuit to the vibrating motor 14 is opened. The motor 14 is then deenergized and the drive or rotating force is transmitted to shaft 13 and the sprocket assembly is terminated within one-half cycle of the supply. Furthermore, as a result of the one-way clutch 44, the inertia in the oscillator assembly is not transmitted to the sprocket assembly 12. The connection of the sprocket on the shaft provides a minimal mass and consequently, there is essentially no tendency for continued rotation as a result of inertia forces. The total result applicant has found is that there is very precise and accurate stepping and driving of the film strip 5 with each of the frames 8 being very accurately positioned within the projector holder for accurate and reliable presentation of the information.

In summary, the film strip 5 of the illustrated embodiment of the invention is disposed within the film holder 4 with a frame 8 precisely aligned with the projection opening 9. When employing a 16 millimeter film, it is only necessary to insure the placement of the notched film on the sprocket whereupon a frame 8 will be precisely aligned with the transmitting or veiwing opening in the holder. If a 35 millimeter film or the like is employed where there is a substantial number of drive openings per frame, it may be necessary to adjust the position of the sprockets to obtain the necessary precise alignment of the film strip 5. This is readily accomplished by depressing of the small release knob 28 and rotating of the sprocket hub 24 independently of the drive shafts 25 and 13.

The control switch unit 48 secured to the back side of the motor 14 is properly then interconnected into the control circuit to maintain power to the selection contacts 52–55 with a continuous disconnect signal on the common output or motor control lead 60. When an operator actuates one of the selection switch means 52–55, power is removed from that lead and contact of the switch unit 48. The motor 14 then continues to rotate until such time as the switch projection or portion 58 is aligned with the related contact 52–55, opening the related circuit and conditioning the motor circuit 14 for stopping of motor 14 upon alignment of the notch 63 in the opposite contact disc 62 with the final control clip contact 64.

Generally, the system once started operates in an automatic sequence where the operator is given a certain period in which to answer a question after which the circuit automatically cycles to present a subsequent question. As more fully disclosed in the co-pending application previously identified, various interlocks may be provided to skip any number of frames 8 in a given category, to provide immediate stepping upon giving a correct answer or, in certain cases, upon an incorrect answer and the like. The particular details of the controlled circuitry are not particularly significant and no further illustration or description have been given.

In the illustrated embodiment of the invention, each revolution is related to four frames and categories. In certain cases, a greater number of frames and categories, for example, eight may be employed and controlled with four frames still transferred for each motor revolution. The switch unit may nevertheless be controlled from the drive motor through a suitable ratio coupling for example, a step-down gear unit. In the assumed example, the coupling would reduce the switch speed by two such that each two revolutions of the shaft would move the switch through a single cycle or revolution. The switch unit would of course include the necessary eight equicircumferentially spaced control contacts and final control contact means properly located in accordance with the previous description.

The present invention has been found to provide a very reliable, simple, inexpensive and long life operation in actual commercial practice. The film strip is accurately positioned each time for optimum presentation of the information.

We claim:

1. Projection apparatus for a film strip presentation means wherein the strip includes a plurality of distinct frames which are to be sequentially aligned with a presentation means in a stepped manner comprising a drive motor having a vibrating drive element energized from an alternating current power source and a one-way clutch means interconnecting said drive element to a rotor, whereby vibration movement of said drive element in only one direction rotates the rotor, a drive means connected to said rotor and having means gripping said film strip for directly and positively moving of said film strip in accordance with the rotation of the rotor, said film strip including information divided into a plurality of categories, each of which comprises a plurality of individual film frames, said frames being arranged in successive similar frame groups, each group including in sequence a frame for each of the categories, said motor and means includes a rotating drive element connected to the rotor and coupled to the film strip for transferring said film strip through said projector with the film strip moving from one frame of a category to the next succeeding frame of the same category in one complete revolution of the rotating drive element.

2. The projection apparatus of claim 1, including a control switch means connected to the motor rotor and being correspondingly positioned, means including a plurality of correspondingly equally spaced switching elements one for each of said frames in each of said groups, said switching elements being located to provide a control signal upon alignment of a related frame in the projector.

3. The projection apparatus of claim 1, including a rotating switch means having a rotor connected to the motor shaft and being correspondingly positioned, a contact plate mounted about the rotor in the plane of the rotor and including a plurality of equicircumferentially spaced contacts, one for each of said frames in each of said groups, said rotor having a control contact spanning the distance between adjacent contacts to maintain engagement with only one of the contacts for all positions of the rotor, individual power connections to said contacts, including selection switch means, actuated of a selection switch means removing power from the associated contact and thereby providing a control signal upon alignment of a related frame in the projector, a final stop contact attached to contact plate, and a final stop contact disc attached to said motor shaft and having equicircumferentially spaced notches, one for each frame in each group, said final stop contact disc being connected to control said motor conjointly with said control contacts.

4. Projection apparatus for a film strip presentation means wherein the strip includes a plurality of distinct frames which are to be sequentially aligned with a presentation means in a stepped manner comprising a drive motor having a vibrating drive element energized from an alternating current power source and a one-way clutch means interconnecting said drive element to a rotor, whereby vibration movement of said drive element in only one direction rotates the rotor, a drive means connected to said rotor and having means dripping said film strip for directly and positively moving of said film strip in accordance with the rotation of the rotor, said film strip including information divided into a plurality of categories each of which comprises a plurality of individual film frames, said frames being arranged in successive similar frame groups, each group including in sequence a frame for each of the categories, said motor and drive means transferring said film strip through said projector with a complete category being moved in sequence by one complete revolution of the motor and each frame within each group moving being correspondingly constructed, whereby corresponding movement of the motor results in movement of each succeeding frame through the projecting portion of the projector.

5. Projection apparatus for sequential presentation of frames carried by a film strip, comprising a rotary drive means for sequentially moving said film strip a predetermined number of frames in each revolution, and to sequentially present the succeeding frames of each category in predetermined number of revolutions, and a switch means having a plurality of spaced contact means one for each of said categories and having a contact actuating means coupled to said rotary drive means to sequentially and cyclically actuate each of said contact means in accordance with the corresponding rotation of said rotary drive means.

6. Projection apparatus for a film strip presentation means wherein the strip includes a plurality of distinct frames which are to be sequentially aligned with a presentation means in a stepped manner comprising a drive motor having a pair of vibrating drive elements energized from a common alternating current power source, said vibrating drive elements vibrating 180 degrees out of phase, and a one-way clutch means having means individually interconnecting each of said drive elements to a common rotor whereby vibration movement of said drive element in only one direction rotates the rotor, and a drive means connected to said rotor, a film strip having equicircumferentially spaced notches along the opposite edges thereof, each frame of said film strip precisely being related to a single pair of notches, said drive means including drive sprockets aligned with the edge notches and positioned to engage the notches with a frame precisely aligned within the projector for directly and positively moving of said film strip in accordance with the rotation of the rotor, said frames being divided in a plurality of successive groups with a corresponding number of frames in each group, the corresponding frames in the plurality of groups each defining a series of related informational presentations, each complete revolution of the sprockets moving the film strip to present a frame from the next group in said series.

References Cited
UNITED STATES PATENTS

| | | | |
|---|---|---|---|
| 3,086,091 | 4/1963 | Reid | 200—11.21 |
| 3,339,815 | 9/1967 | Fredkin | 226—33 X |

ALLEN N. KNOWLES, Primary Examiner

G. A. CHURCH, Assistant Examiner

U.S. Cl. X.R.

226—188